United States Patent
Yu et al.

(10) Patent No.: US 8,818,104 B2
(45) Date of Patent: Aug. 26, 2014

(54) IMAGE PROCESSING APPARATUS AND IMAGE PROCESSING METHOD

(71) Applicant: Fujitsu Limited, Kawasaki (JP)

(72) Inventors: Shanshan Yu, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/937,680

(22) Filed: Jul. 9, 2013

(65) Prior Publication Data

US 2013/0294699 A1    Nov. 7, 2013

Related U.S. Application Data

(60) Division of application No. 13/064,272, filed on Mar. 15, 2011, now Pat. No. 8,509,539, which is a continuation of application No. PCT/JP2008/066790, filed on Sep. 17, 2008.

(51) Int. Cl.
*G06K 9/46* (2006.01)
*G06K 9/66* (2006.01)
*G06K 9/00* (2006.01)

(52) U.S. Cl.
CPC .................... *G06K 9/00228* (2013.01)
USPC ........................................ 382/195; 382/190

(58) Field of Classification Search
CPC .................................................. G06K 9/00228
USPC .................................. 382/118, 190, 195, 201
See application file for complete search history.

(56) References Cited

U.S. PATENT DOCUMENTS

| | | | |
|---|---|---|---|
| 6,829,384 B2 | 12/2004 | Schneiderman et al. | |
| 7,263,220 B2 | 8/2007 | Crandall et al. | |
| 7,848,566 B2 | 12/2010 | Schneiderman | |
| 7,925,093 B2 * | 4/2011 | Ikeda et al. | 382/190 |
| 8,189,866 B1 | 5/2012 | Gu et al. | |
| 2005/0238209 A1 * | 10/2005 | Ikeda et al. | 382/118 |
| 2007/0053590 A1 * | 3/2007 | Kozakaya | 382/181 |
| 2010/0014758 A1 * | 1/2010 | Yano et al. | 382/195 |
| 2010/0054550 A1 * | 3/2010 | Okada | 382/118 |
| 2011/0074973 A1 * | 3/2011 | Hayashi | 348/222.1 |
| 2012/0207358 A1 | 8/2012 | Blonk et al. | |

FOREIGN PATENT DOCUMENTS

| | | |
|---|---|---|
| JP | 62-217390 | 9/1987 |
| JP | 10-162143 | 6/1998 |
| JP | 2004-246618 | 9/2004 |

OTHER PUBLICATIONS

Henry Schneiderman et al., "Object Detection Using the Statistics of Parts", International Journal of Computer Vision, 2002, 58 pages.
International Search Report for PCT/JP2008/066790, mailed Oct. 21, 2008.
U.S. Appl. No. 13/064,272, filed Mar. 15, 2011, Shanshan Yu et al., Fujitsu Limited.

(Continued)

*Primary Examiner* — Samir Ahmed
(74) *Attorney, Agent, or Firm* — Staas & Halsey LLP

(57) ABSTRACT

An image processing apparatus includes a storing unit that stores dictionary data including information on a feature area that indicates an area where a feature of a subject appears; and a subject determination unit that compares, when an input image is acquired, the feature area of the dictionary data with an area of the input image corresponding to the feature area of the dictionary data, to determine whether the input image includes the subject.

2 Claims, 7 Drawing Sheets

(a)

(b)

(56) References Cited

OTHER PUBLICATIONS

Office Action issued on Apr. 9, 2013 in U.S. Appl. No. 13/064,272.

Office Action issued on Nov. 9, 2012 in U.S. Appl. No. 13/064,272.

Office Action issued on Aug. 2, 2012 in U.S. Appl. No. 13/064,272.

* cited by examiner

FIG.4

HIERARCHICAL DATA

| POSITION INFORMATION | LEVEL |
|---|---|
| 1, 1 | 1 |
| 1, 2 | 1 |
| 1, 3 | 2 |
| ... | ... |

FIG.5

MON-FACE LEARNING DATA

| POSITION INFORMATION | CONVERSION COEFFICIENT VALUE |
|---|---|
| 1, 1 | 1 |
| 1, 2 | 0 |
| 1, 3 | 0 |
| ... | ... |

FIG.6

COMPARISON TARGET DATA

| POSITION INFORMATION | CONVERSION COEFFICIENT VALUE |
|---|---|
| 1, 1 | 1 |
| 1, 2 | 0 |
| 1, 3 | 0 |
| ... | ... |

FIG.7

COMPARISON RESULT TABLE

| DETECTION RANGE IDENTIFICATION INFORMATION | COMPARISON RESULT |
|---|---|
| 1001 | ○ |
| 1002 | ○ |
| 1003 | ○ |
| ... | ... |

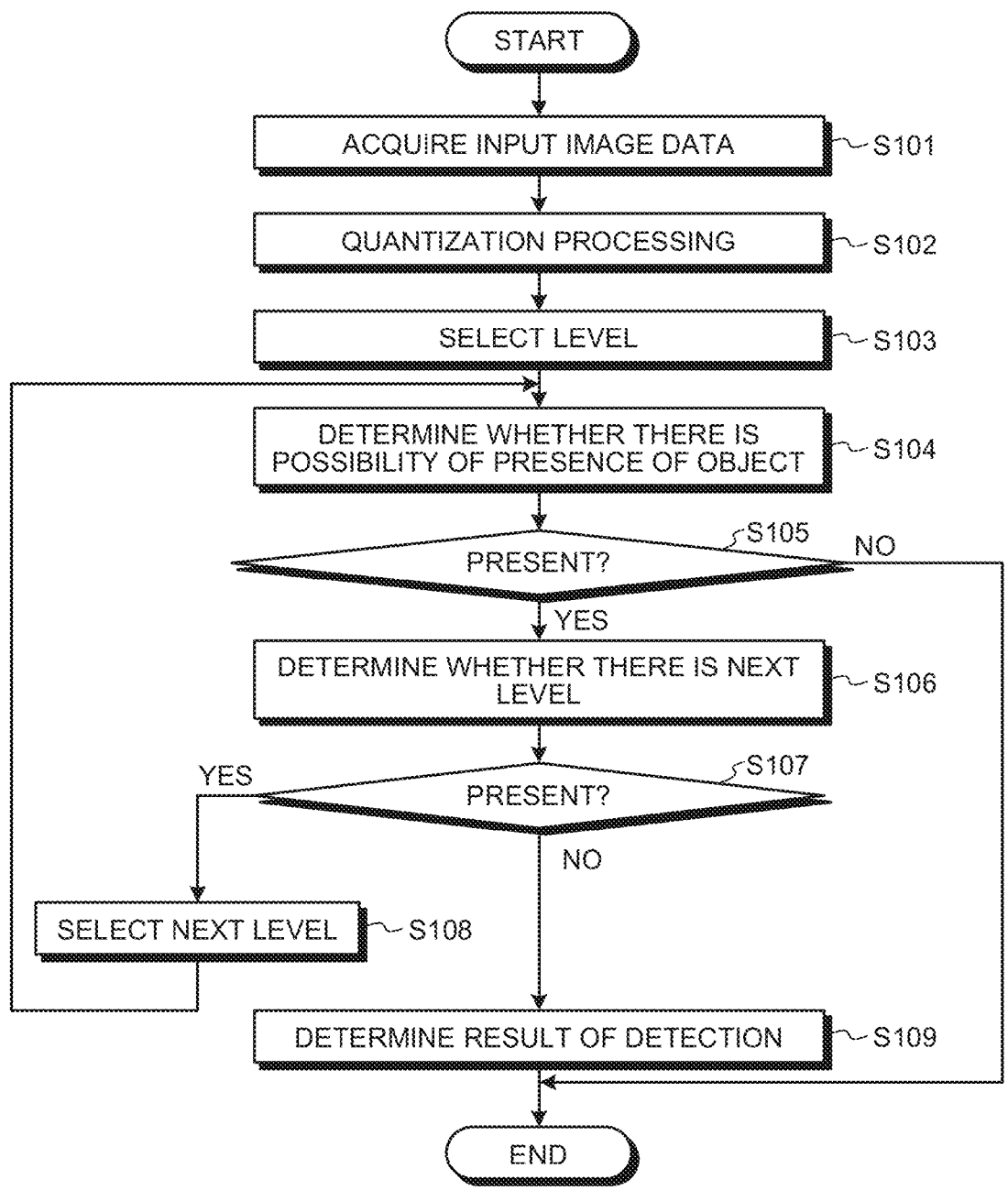

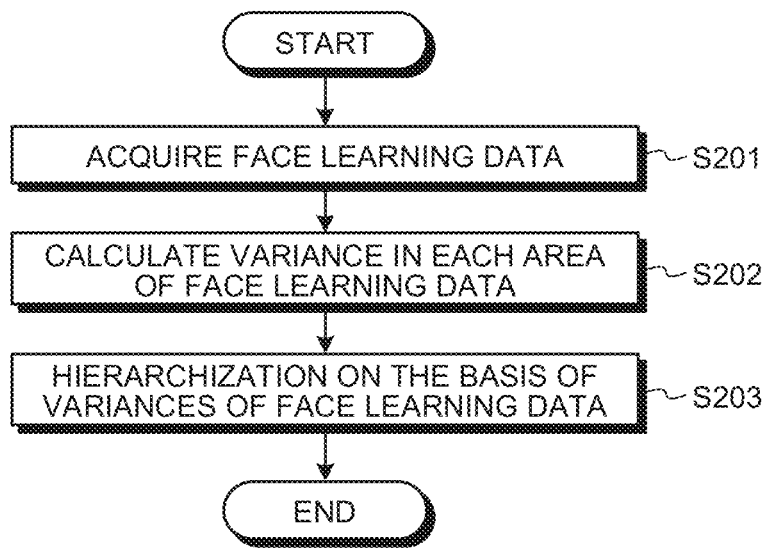
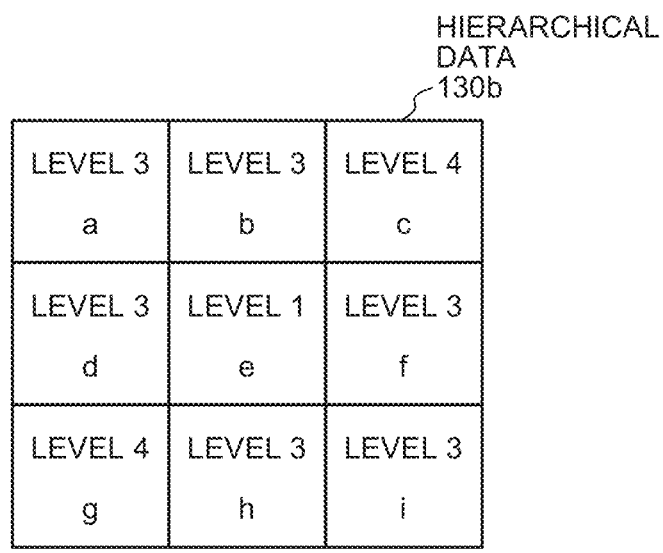

IMAGE PROCESSING APPARATUS AND IMAGE PROCESSING METHOD

CROSS-REFERENCE TO RELATED APPLICATION

This application claims the benefit of and is a continuation of International Application No. PCT/JP2008/066790, filed on Sep. 17, 2008, and a Divisional Application of U.S. Pat. No. 8,509,359 (formerly U.S. patent application Ser. No. 13/064,272) filed on Mar. 15, 2011, the entire contents of which are incorporated herein by reference.

FIELD

The embodiment discussed herein is directed to an image processing apparatus and an image processing method for quantizing image data.

BACKGROUND

In recent years, research has been made about object detection to detect various types of objects (such as a person's face and a car) from an image that is captured by a camera or the like. The object detection technology includes learning the features of objects to be detected to create learning data in advance, and comparing the created learning data and image data to determine whether the objects to be detected are included in the image.

The image data itself contains an enormous amount of information while the object detection technology has only to determine whether there is an object to be searched for in the image. The image data therefore needs to be reduced to save memory resources by utilizing information quantization techniques.

In some information quantization techniques, the image data is subjected to frequency conversion (wavelet transformation) and quantization processing is performed on the basis of the magnitudes of the resulting conversion coefficients (or the magnitudes of differences in pixel value between adjoining pixels) (for example, see H. Schneiderman and T. Kanade, "Object Detection Using the Statistics of Parts", *International Journal of Computer Vision*, 2002, which is referred to as "Schneiderman" hereinafter). According to such quantization processing, the conversion coefficients and quantization thresholds are compared to quantize the image data in three levels. This allows a reduction of the area for storing the image data and learning data intended for object detection.

Since the chances for image data to include an object to be detected are small on the whole, comparing all the areas of the image data and those of the learning data in detail would involve comparisons of the image data and learning data even in unnecessary areas, making the object detection processing wasteful.

To avoid waste of the object detection processing, a technique has been known in which rough object detection is performed on the search areas of the image data, and detailed object detection is performed only if there is a possibility that the image data includes an object to be detected (for example, see Japanese Laid-open Patent Publication No. 2004-246618). According to such a technique, when rough object detection is performed and it is determined that the image data includes no object to be detected, the processing is shifted to the next area. This makes it possible to speed up the object detection processing.

The foregoing conventional techniques, however, have had a problem with performing the object detection with high accuracy and speeding up the object detection processing.

More specifically, according to the conventional techniques, the speedup of the object detection processing is effected by performing rough object detection on the search areas of the image data. Consequently, objects similar to but different from the object to be detected can often be mistaken for the object to be detected. After the mistaking for the object to be detected, the processing enters the detailed object detection despite the absence of the object to be detected. This consequently delays the object detection processing.

SUMMARY

According to an aspect of an embodiment of the invention, an image processing apparatus includes a storing unit that stores dictionary data including information on a feature area that indicates an area where a feature of a subject appears; and a subject determination unit that compares, when an input image is acquired, the feature area of the dictionary data with an area of the input image corresponding to the feature area of the dictionary data, to determine whether the input image includes the subject.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 4 is a chart illustrating an example of the data structure of hierarchical data;

FIG. 5 is a chart illustrating an example of the data structure of non-face learning data;

FIG. 6 is a chart illustrating an example of the data structure of comparison target data;

FIG. 7 is a chart illustrating an example of the data structure of a comparison result table;

FIG. 8 is a flowchart illustrating the processing procedure of the image processing apparatus according to the present embodiment;

FIG. 9 is a flowchart illustrating the processing procedure for creating the hierarchical data;

FIG. 10 is a diagram for explaining an example of smoothing processing; and

DESCRIPTION OF EMBODIMENT

A preferred embodiment of the present invention will be explained with reference to accompanying drawings. It should be noted that the present invention is not limited by such an embodiment.

Initially, an outline and characteristics of the image processing apparatus according to the present embodiment will be described. When comparing image data (image data to be subjected to object detection) and learning data for object detection, the image processing apparatus according to the present embodiment hierarchizes areas of the learning data depending on the degrees of importance of the respective areas of the subject, and compares the image data and the learning data in order, starting from the hierarchical level of the highest degree of importance, to speed up the object detection processing. Assuming that the subject is a human face, the areas corresponding to the positions of the eyes, nose, and mouth in the face rank high in level in terms of the degree of importance since people have the eyes, nose, and mouth generally in the same positions. In contact, the areas corresponding to hair and other positions are low in level in terms of the degree of importance since hairs and the like vary in position from one person to another.

Figure 1:
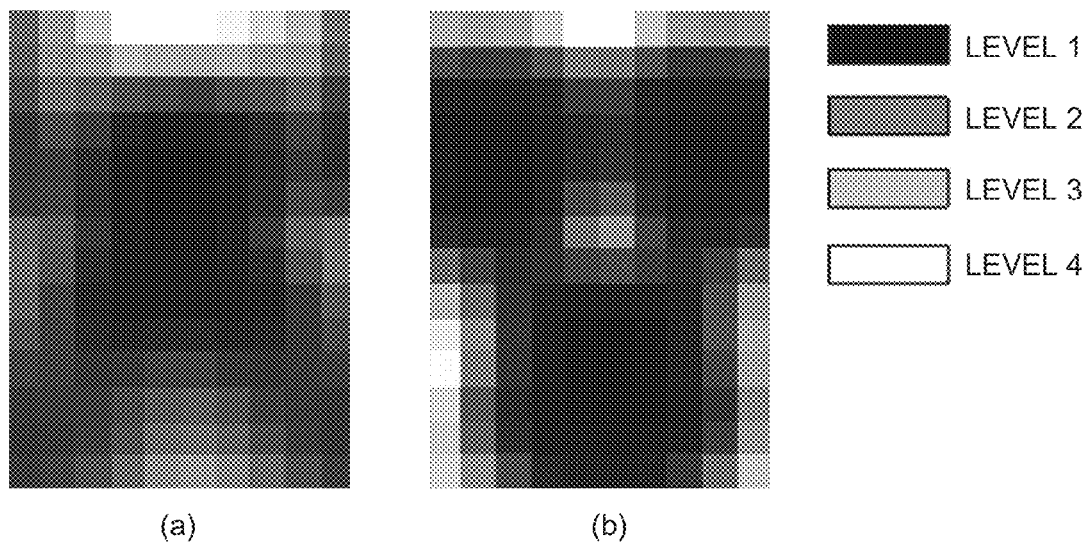
FIG. 1 is a diagram illustrating an example of hierarchized learning data.

FIG. 1 is a diagram illustrating an example of the hierarchized learning data. As an example, FIG. 1 illustrates images with a human face as the subject. The images illustrate a front view of a face in full size, covering most of the vertical length from the head to the chin and most of the horizontal width from ear to ear. FIG. 1(a) is learning data in a vertical direction, resulting from the frequency conversion (wavelet transform) of a face image. FIG. 1(b) is learning data in a horizontal direction, resulting from the frequency conversion of the face image. In FIG. 1, level 1 is the highest in the degree of importance. The degree of importance decreases in order of levels 2, 3, and 4 (level 4 is the lowest in the degree of importance).

In the example illustrated in FIG. 1(a), the areas of the image corresponding to the nose position (generally in the center of the image) rank as level 1. In the example illustrated in FIG. 1(b), the areas of the image corresponding to the eyes (upper right and left in the image) and mouth (bottom center in the diagram) rank as level 1. When performing object detection, the image processing apparatus according to the present embodiment initially compares the areas of the learning data and those of the image data corresponding to level 1. If it is determined that no subject is included, the image processing apparatus omits the object detection in the areas corresponding to the remaining levels 2 to 4, and outputs the result of determination that there is no subject in the image data.

On the other hand, if it is determined that a subject is included, the image processing apparatus compares the areas of the learning data and those of the image data corresponding to level 2. If it is determined that no subject is included, the image processing apparatus omits the object detection in the areas corresponding to the remaining levels 3 and 4, and outputs the result of determination that there is no subject in the image data.

On the other hand, if it is determined that a subject is included, the image processing apparatus compares the areas of the learning data and those of the image data corresponding to level 3. If it is determined that no subject is included, the image processing apparatus omits the object detection in the areas corresponding to the remaining level 4, and outputs the result of determination that there is no subject in the image data.

On the other hand, if it is determined that a subject is included, the image processing apparatus compares the areas of the learning data and those of the image data corresponding to level 4. If it is determined at level 4 that a subject is included, the image processing apparatus outputs the result of determination that there is a subject in the image data.

As described above, the image processing apparatus according to the present embodiment hierarchizes the learning data, and omits object detection corresponding to a remaining level or levels depending on the comparison result at each level. This can speed up the processing for object detection. Since the hierarchical levels are set according to the degrees of importance of the subject, it is also possible to prevent false detection of the subject.

Figures 2, 3:
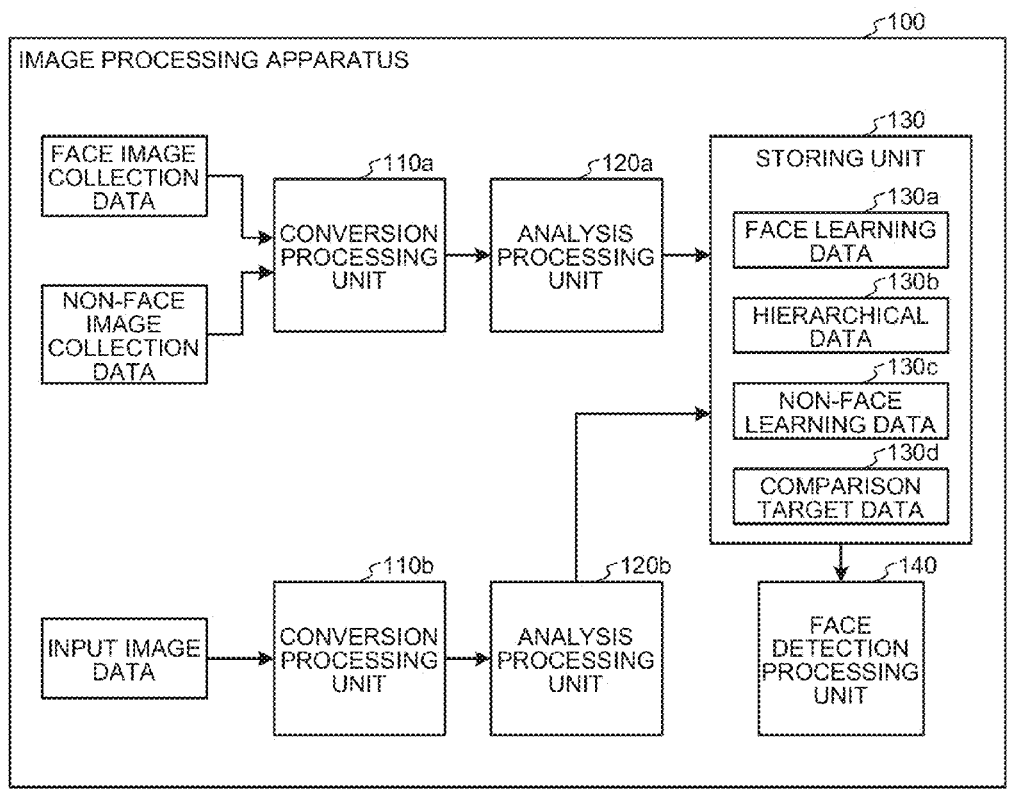
FIG. 2 is a functional block diagram illustrating the configuration of an image processing apparatus according to the present embodiment.
FIG. 3 is a chart illustrating an example of the data structure of face learning data.

Next, the configuration of the image processing apparatus according to the embodiment will be described. FIG. 2 is a functional block diagram illustrating the configuration of the image processing apparatus 100 according to the embodiment. As illustrated in FIG. 2, the image processing apparatus 100 includes conversion processing units 110a and 110b, analysis processing units 120a and 120b, a storing unit 130, and a face detection processing unit 140.

The conversion processing unit 110a is a processing unit that acquires face image collection data and non-face image collection data and performs frequency conversion processing (for example, wavelet transform) on the face image collection data and non-face image collection data acquired. The frequency conversion processing on the image data is the same as that of known techniques.

The face image collection data is image data on a collection of face images of various persons. The non-face image collection data is image data on a collection of various images other than face images. The face image collection data and the non-face image collection data have the same size.

The conversion processing unit 110a acquires the face image collection data and the non-face image collection data from an input device, a storage device (not illustrated), and the like. The conversion processing unit 110a outputs the frequency-converted face image collection data and non-face image collection data to the analysis processing unit 120a. In the following description, the frequency-converted face image collection data will be referred to as converted face image collection data. The frequency-converted non-face image collection data will be referred to as converted non-face image collection data.

The conversion processing unit 110b is a processing unit that acquires input image data and performs frequency conversion processing (for example, wavelet transform) on the input image data acquired. The frequency conversion processing on the image data is the same as that of known techniques. The input image data is the image data to be subjected to the object detection. The conversion processing unit 110a acquires the input image data from an input device, a storage device (not illustrated), etc. The conversion processing unit 110b outputs the frequency-converted input image data to the analysis processing unit 120b.

The analysis processing unit 120a is a processing unit that acquires the converted face image collection data and the converted non-face image collection data and then creates face learning data on the basis of the converted face image collection data and creates non-face learning data on the basis of the converted non-face image collection data. The analysis processing unit 120a calculates variances of the face learning data, and classifies (hierarchizes) the face learning data into a plurality of levels on the basis of the variances calculated.

Initially, the processing by which the analysis processing unit 120a creates the face learning data will be concretely described. The analysis processing unit 120a extracts a single piece of image data from the image data included in the converted face image collection data. The image data included in the converted face image collection data is composed of a collection of images each illustrating a face in full size, covering most of the vertical length from the head to the chin and most of the horizontal width from ear to ear. It will be understood that the learning data, intended for the detection of various faces, may include not only data on facial shots from right in front, but also data on shots obliquely upward, downward, to the right, and to the left, data on faces with a hat or with glasses, and data on persons of all ages and genders. The division processing unit 120a then compares the conversion coefficients resulting from the frequency conversion of each piece of image data with quantization thresholds to quantize the conversion coefficients (in three values or four values). The quantization thresholds shall be set by the administrator in advance.

The analysis processing unit 120a similarly quantizes the rest of the image data included in the converted face image collection data by the foregoing technique. The analysis processing unit 120a then compares the conversion coefficient values of the pieces of quantized image data (the conversion coefficient values corresponding to the same positions in the respective pieces of image data), and creates face learning data on the basis of the frequencies of the conversion coefficient values. For example, suppose that the pieces of image data are compared for the coefficient values at position (x1, y1), and the frequency of the coefficient value "2" is found to be higher than those of the coefficient values "0" and "1". In such a case, the coefficient value at position (x1, y1) of the face learning data is set to "2". In the meantime, the variance of the coefficient values is calculated in response to the counts of the coefficient frequencies. The variance decreases in value if the coefficient values concentrate on any one of the values of 0, 1, and 2.

FIG. 3 is a chart illustrating an example of the data structure of the face learning data. As illustrated in FIG. 3, the face learning data contains position information and conversion coefficient values in association with each other. It should be noted that the face learning data is not limited to the data structure illustrated in FIG. 3. For example, conversion coefficient values may be stored in association with respective blocks of conversion coefficients (for example, eight conversion coefficients) to be compared for object detection.

Next, the processing by which the analysis processing unit 120a classifies the face learning data into the plurality of levels will be described. The analysis processing unit 120a compares the calculated variances and comparative values 1, 2, and 3 (where comparative value 1<comparative value 2<comparative value 3) and classifies the face learning data into levels 1 to 4.

For example, the analysis processing unit 120a creates hierarchical data by:
setting areas of the face image data where the variance<comparative value 1 to level 1;
setting areas where comparative value 1≤the variance<comparative value 2 to level 2;
setting areas where comparative value 2≤the variance<comparative value 3 to level 3; and
setting areas of the face image data where comparative value 3≤the variance to level 4.

As described in FIG. 1, the face learning data illustrates small variances (variance values) in the vicinity of the nose and the like in the vertical direction, and illustrates small variances in the vicinity of the eyes and mouth in the horizontal direction. Such a tendency results from the concentration of data on locations that present facial features.

FIG. 4 is a chart illustrating an example of the data structure of the hierarchical data. As illustrated in FIG. 4, the hierarchical data contains position information and hierarchical levels in association with each other. It should be noted that while the hierarchical levels are associated with the position information by way of example, such a configuration is not restrictive. The areas of the face learning data and the hierarchical levels may be stored in association with each other.

Next, the processing by which the analysis processing unit 120a creates the non-face learning data will be described. The division processing unit 120b extracts a single piece of image data from the image data included in the converted non-face image collection data. The image data included in the non-face collection data is of images with no face therein. The division processing unit 120a then compares the conversion coefficients resulting from the frequency conversion of each piece of image data with quantization thresholds to quantize the conversion coefficients (in three values or four values). The quantization thresholds shall be set by the administrator in advance.

The analysis processing unit 120a similarly quantizes the rest of the image data included in the converted non-face image collection data by the foregoing technique. The analysis processing unit 120a then compares the conversion coefficient values of the pieces of quantized image data (the conversion coefficient values corresponding to the same positions in the respective pieces of image data), and creates non-face learning data on the basis of the frequencies of the conversion coefficient values. For example, suppose that the pieces of image data are compared for the conversion coefficient values at position (x1, y1), and the frequency of the conversion coefficient value "2" is found to be higher than those of the conversion coefficient values "0" and "1". In such a case, the conversion coefficient value at position (x1, y1) of the non-face learning data is set to "2".

FIG. 5 is a chart illustrating an example of the data structure of the non-face learning data. As illustrated in FIG. 5, the non-face learning data contains position information and conversion coefficient values in association with each other. It should be noted that the non-face learning data is not limited to the data structure illustrated in FIG. 5. For example, conversion coefficient values may be stored in association with respective blocks of conversion coefficients (for example, eight conversion coefficients) to be compared for object detection.

The analysis processing unit 120b is a processing unit that, when acquiring the frequency-converted input image data, quantizes the acquired input image data. The analysis processing unit 120b outputs the quantized input image data to the storing unit 130. In the following description, the input image data quantized will be referred to as comparison target data.

Specifically, the analysis processing unit 120b compares conversion coefficients and quantization thresholds to quantize the pixel values of the corresponding blocks (in three values or four values). The quantization thresholds shall be set by the administrator in advance.

FIG. 6 is a chart illustrating an example of the data structure of the comparison target data. As illustrated in FIG. 6, the comparison target data contains position information and conversion coefficient values in association with each other. It should be noted that the comparison target data is not limited to the data structure illustrated in FIG. 6. For example, conversion coefficient values may be stored in association with respective blocks of conversion coefficients (for example, eight conversion coefficients) to be compared for object detection.

The storing unit 130 is a storing unit that stores the face learning data, hierarchical data, and non-face learning data which are output from the analysis processing unit 120a, and the comparison target data which is output from the analysis processing unit 120b.

The face detection processing unit 140 is a processing unit that sets the detection ranges and compares the face learning data 130a, non-face learning data 130c, and comparison target data 130d in order of levels 1 to 4 within the detection ranges, thereby determining whether the input image data contains a face image. The face detection processing unit 140 may be referred to as a subject determination unit. If it is determined in a level that the input image includes no face, the face detection processing unit 140 omits the object detection in the rest of the levels and moves to the object detection processing on the next detection ranges. In the following description, the input image data shall mean an image that is clipped out of the target of the face detection processing (the input frame itself). Such an image corresponds to the comparison target data. It is unknown what size of face the whole frame intended for face detection includes. The area of the comparison target data is thus set by changing the comparison target data into a plurality of sizes and performing clipping while shifting the clipping position in the input image data.

The face detection processing unit 140 initially compares the conversion coefficient values in the areas corresponding to level 1 (hereinafter, referred to as first areas) within the detection range of the face learning data, the conversion coefficient values of the non-face learning data 130c corresponding to the first areas, and the conversion coefficient values of the comparison target data 130d corresponding to the first areas.

If at level 1 the matching rate between the conversion coefficient values of the comparison target data 130d and the face learning data 130a is higher than the matching rate between the conversion coefficient values of the comparison target data 130d and the non-face learning data 130c, the face detection processing unit 140 shifts the processing to level 2. If the matching rate between the conversion coefficient values of the comparison target data 130d and the face learning data 130a is not higher than the matching rate between the conversion coefficient values of the comparison target data 130d and the non-face learning data 130c, i.e., if there is no possibility that the comparison target data 130d under processing is of a face, the face detection processing unit 140 omits the processing of levels 2 to 4 and ends the processing on the input image data.

If at level 1 the input image data is determined to include a face, the face detection processing unit 140 compares the conversion coefficient values in the areas corresponding to level 2 (hereinafter, referred to as second areas) within the detection range of the face learning data 130a, the conversion coefficient values of the non-face learning data 130c corresponding to the second areas, and the conversion coefficient values of the comparison target data 130d corresponding to the second areas.

If at level 2 the matching rate between the conversion coefficient values of the comparison target data 130d and the face learning data 130a is higher than the matching rate between the conversion coefficient values of the comparison target data 130d and the non-face learning data 130c, the face detection processing unit 140 shifts the processing to level 3. If the matching rate between the conversion coefficient values of the comparison target data 130d and the face learning data 130a is not higher than the matching rate between the conversion coefficient values of the comparison target data 130d and the non-face learning data 130c, the face detection processing unit 140 omits the processing of levels 3 and 4 and ends the processing on the input image data.

If at level 2 the input image data is determined to include a face, the face detection processing unit 140 compares the conversion coefficient values in the areas corresponding to level 3 (hereinafter, referred to as third areas) within the detection range of the face learning data, the conversion coefficient values of the non-face learning data 130c corresponding to the third areas, and the conversion coefficient values of the comparison target data 130d corresponding to the second areas.

If at level 3 the matching rate between the conversion coefficient values of the comparison target data 130d and the face learning data 130a is higher than the matching rate between the conversion coefficient values of the comparison target data 130d and the non-face learning data 130c, the face detection processing unit 140 shifts the processing to level 4. If the matching rate between the conversion coefficient values of the comparison target data 130d and the face learning data 130a is not higher than the matching rate between the conversion coefficient values of the comparison target data 130d and the non-face learning data 130c, the face detection processing unit 140 omits the processing of level 4 and ends the input image data processing.

If at level 3 the input image data is determined to include a face, the face detection processing unit 140 compares the conversion coefficient values in the areas corresponding to level 4 (hereinafter, referred to as fourth areas) within the detection range of the face learning data, the conversion coefficient values of the non-face learning data 130c corresponding to the fourth areas, and the conversion coefficient values of the comparison target data 130d corresponding to the second areas.

If at level 4 the matching rate between the conversion coefficient values of the comparison target data 130d and the face learning data 130a is higher than the matching rate between the conversion coefficient values of the comparison target data 130d and the non-face learning data 130c, the face detection processing unit 140 determines that a facial feature is included in the corresponding detection range. Otherwise, the face detection processing unit 140 determines that no facial feature is included in the corresponding detection range.

The result of determination of the face detection processing unit 140 is registered into a comparison result table. FIG. 7 is a chart illustrating an example of the data structure of the comparison result table. As illustrated in FIG. 7, the comparison result table contains detection range identification information, which identifies the detection range, and comparison results in association with each other. If the comparison between the detection ranges of the face learning data 130a, the non-face learning data 130c, and the comparison target data 130d results in the determination that a facial feature is included, the face detection processing unit 140 registers a "circle" into the comparison result. If it is determined that no facial feature is included, the face detection processing unit 140 registers a "cross" into the comparison result.

It should be noted that the comparison results need not necessarily be saved with respect to each of the detection ranges as illustrated in FIG. 7. For example, the numbers of "circles" and "crosses" may be summarized and only the result of summary may be stored in the comparison result table. Such a comparison result table shall be retained by the face detection processing unit 140.

Next, the processing procedure of the image processing apparatus 100 according to the present embodiment will be described. FIG. 8 is a flowchart illustrating the processing procedure of the image processing apparatus 100 according to the present embodiment. As illustrated in FIG. 8, the image processing apparatus 100 acquires input image data (step S101), and performs the quantization processing (step S102).

At step S103, the image processing apparatus 100 initially selects level 1.

The image processing apparatus 100 compares the areas of the face learning data 130a, the non-face learning data 130c, and the comparison target data 130d corresponding to the selected level, and determines whether there is an object (object to be detected) (step S104).

If there is no possibility of the presence of the object (step S105, No), the image processing apparatus 100 ends the processing. On the other hand, if there is a possibility of the presence of the object (step S105, Yes), the image processing apparatus 100 determines whether there is a next level (step S106).

If there is the next level (step S107, Yes), the image processing apparatus 100 selects the next level (step S108) and moves to step S104. For example, if level 1 is currently selected, the image processing apparatus 100 selects level 2 at step S108.

On the other hand, if there is no next level (step S107, No), the image processing apparatus 100 determines the result of detection (step S109).

Next, the processing procedure by which the image processing apparatus according to the present embodiment creates the hierarchical data 130b will be described. FIG. 9 is a flowchart illustrating the processing procedure for creating the hierarchical data 130b.

As illustrated in FIG. 9, the image processing apparatus 100 acquires the face learning data 130a (step S201), and calculates the variance of the face learning data in each area (step S202). The image processing apparatus 100 then creates the hierarchical data 130b by hierarchization (step S203) on the basis of the variances of the face learning data.

As has been described above, the image processing apparatus 100 according to the present embodiment, when comparing image data (image data to be subjected to object detection) and learning data for object detection, hierarchizes the areas of the learning data depending on the degrees of importance of the respective areas of the subject. The image processing apparatus 100 compares the image data and the learning data in order, starting from the level of the highest degree of importance, and omits the object detection processing in unnecessary levels. This makes it possible to perform the object detection with high accuracy and speed up the object detection processing.

While the image processing apparatus 100 according to the present embodiment calculates the variances of the face learning data 130a and creates the hierarchical data 130b, the method of calculating the hierarchical data is not limited thereto. For example, the image processing apparatus 100 may determine the degrees of importance of the respective areas of the image data and classify the areas into a plurality of levels on the basis of histograms of the conversion coefficients and frequencies resulting from the frequency conversion of the image data.

After the creation of the hierarchical data 130b, the image processing apparatus 100 may perform smoothing processing to correct the levels in consideration of the relationship with surrounding levels. FIG. 10 is a diagram for explaining an example of the smoothing processing. For example, FIG. 10 illustrates a case where the hierarchical data 130b is composed of nine blocks a to i. The block to be subjected to the smoothing processing is "e".

The image processing apparatus 100 calculates the level of the block to be corrected by the following (rounded to the nearest integer):

corrected level=(the level of the right block+the level of the left block+the level of the block above+the level of the block below+the level of the block to be corrected×2)/6.

For example, when the smoothing processing is performed on the block e in FIG. 10, the block e after the smoothing processing ranks as level 2. The image processing apparatus 100 can perform the smoothing processing on the hierarchical data 130b to suppress the effect of noise etc. The hierarchization method described in the present embodiment can be effectively practiced in combination with publicly-known face detection techniques. For example, the hierarchization method may be combined with Schneiderman. In such a case, the hierarchical structure may be determined with reference to the variances of the face dictionary according to Schneiderman. There are retained histogram-based dictionaries at respective positions in the conversion coefficients of local operators. The levels at the respective positions in the conversion coefficients of the local operators can be determined with reference to the variances of the histograms. While the levels can be determined with reference to the variances of the dictionaries as described above, they may be determined by the administrator in advance or by other methods.

All or part of processes that have been described in the present embodiment as being automatically performed may be performed manually. All or part of processes that have been described as being manually performed may be automatically performed by publicly known methods. Moreover, the processing procedures, control procedures, specific names, and information including various data and parameters that have been described above or illustrated in the drawings may be arbitrarily modified unless otherwise specified.

The components of the image processing apparatus 100 illustrated in FIG. 2 are functionally conceptual ones, and need not necessarily have the illustrated physical configuration. Various types of processing procedures described in the present embodiments may be implemented by running a prepared program on a computer such as a personal computer or a workstation.

Figure 11:
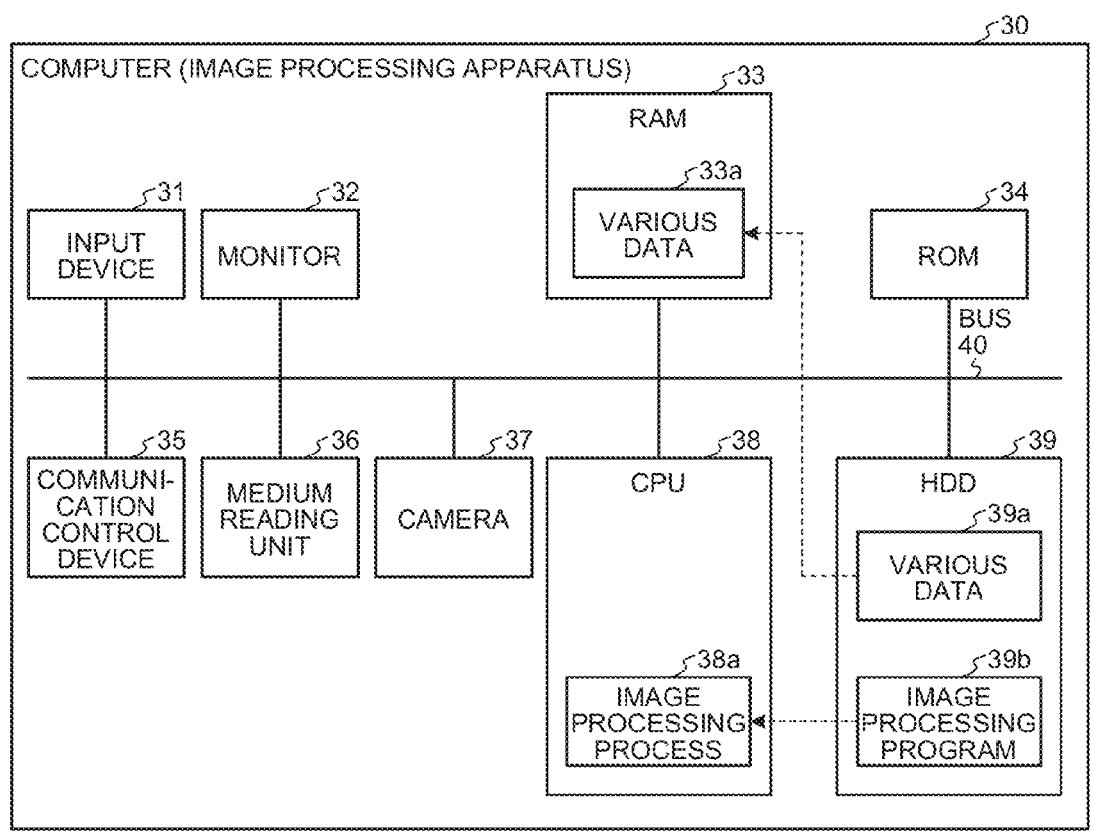
FIG. 11 is a diagram illustrating the hardware configuration of a computer that constitutes the image processing apparatus according to the present embodiment.

FIG. 11 is a diagram illustrating the hardware configuration of a computer that constitutes the image processing apparatus 100 according to the present embodiment. As illustrated in FIG. 11, a computer (image processing apparatus) 30 includes an input device 31, a monitor 32, a random access memory (RAM) 33, a read only memory (ROM) 34, a communication control device 35 which performs communication with other devices over a network, a medium reading device 36 which reads data from a storing medium, a camera 37, a central processing unit (CPU) 38, and a hard disk drive (HDD) 39. Such components are connected with a bus 40.

The HDD 39 contains an image processing program 39b which provides the same functions as those of the image processing apparatus 100 described above. The CPU 38 reads and executes the image processing program 39b, whereby an image processing process 38a is activated.

Here, the image processing process 38a corresponds to the conversion processing units 110a and 110b, the analysis processing units 120a and 120b, and the face detection processing unit 140 of FIG. 2. The HDD 39 contains various types of data 39a corresponding to the information stored in the storing unit 130 of the image processing apparatus 100. The CPU 38 reads the various types of data 39a stored in the HDD 39, stores the data into the RAM 33, and performs the image data quantization and object detection by using various types of data 33a stored in the RAM 33.

It should be noted that the image processing program 39b illustrated in FIG. 11 need not necessarily be stored in the HDD 39 from the beginning. For example, the image processing program 39b may previously be stored in a "portable physical medium" such as a flexible disk (FD), CD-ROM, DVD disc, magneto-optical disc, and IC card to be inserted into the computer, a "fixed physical medium" such as a hard disk drive (HDD) which is provided inside or outside the computer, or "another computer (or server)" which is connected to the computer through a public circuit, the Internet, LAN, WAN, or the like, so that the computer reads the image processing program 39*b* from such a medium for execution.

According to an aspect of the image processing apparatus, it is possible to omit needless object detection processing for processing speedup and detect the subject included in the image data with high accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing apparatus comprising:
   a storing unit that stores information on a feature area that indicates an area where a feature of a subject appears including a first data containing position information on the image and conversion coefficient value of the position information in association with each other and a second data includes the position information and a hierarchical level indicating variance of the conversion coefficient value in association with each other; and
   a subject determination unit that compares, when an input image is acquired, referring to the first data and the second data, the conversion coefficient value of the input image with the conversion coefficient value of the position information corresponding to the hierarchical level and determines whether the input image includes the subject based on the result of comparison and the hierarchical level corresponding to the result of comparison.

2. An image processing method performed in an image processing apparatus, comprising:
   referring to a storing unit that stores information on a feature area that indicates an area where a feature of a subject appears including a first data containing position information on the image and conversion coefficient value of the position information in association with each other and a second data includes the position information and a hierarchical level indicating variance of the conversion coefficient value in association with each other;
   comparing, when an input image is acquired, the conversion coefficient value of the input image with the conversion coefficient value of the position information corresponding to the hierarchical level; and
   determining whether the input image includes the subject based on the result of comparison and the hierarchical level corresponding to the result of comparison.

* * * * *